(12) United States Patent
Killgour et al.

(10) Patent No.: US 9,840,180 B2
(45) Date of Patent: Dec. 12, 2017

(54) REPOSITIONABLE LOAD CARRYING TRAY ASSEMBLY FOR A VEHICLE

(71) Applicant: PIVOTTRAY PTY LTD, Burleigh Heads, Queensland (AU)

(72) Inventors: Paul Brian Alec Killgour, Cabarita Beach (AU); Barry Roy Middlebrook, Werribee (AU)

(73) Assignee: PIVOTTRAY PTY LTD (AU)

( * ) Notice: Subject to any disclaimer, the term of this patent is extended or adjusted under 35 U.S.C. 154(b) by 0 days.

(21) Appl. No.: 15/119,372

(22) PCT Filed: Mar. 3, 2015

(86) PCT No.: PCT/AU2015/000122
§ 371 (c)(1),
(2) Date: Aug. 16, 2016

(87) PCT Pub. No.: WO2015/131232
PCT Pub. Date: Sep. 11, 2015

(65) Prior Publication Data
US 2017/0057392 A1    Mar. 2, 2017

(30) Foreign Application Priority Data

Mar. 3, 2014 (AU) .................. 2014900696

(51) Int. Cl.
*B60P 1/16* (2006.01)
*B60P 1/30* (2006.01)
(Continued)

(52) U.S. Cl.
CPC ............ *B60P 1/16* (2013.01); *B60P 1/283* (2013.01); *B60P 1/30* (2013.01); *B60P 3/122* (2013.01); *B62D 33/02* (2013.01)

(58) Field of Classification Search
CPC .... B60P 1/22; B60P 1/16; B60P 1/283; B60P 3/122; B62D 33/02
See application file for complete search history.

(56) References Cited

U.S. PATENT DOCUMENTS 2,621,814 A    12/1952    Lisota
4,770,592 A *  9/1988    Winter .................... B60P 3/122
                                                    414/477
(Continued)

FOREIGN PATENT DOCUMENTS

EP    0022720         1/1981
FR    2730681 A1 *    8/1996    ............... B60P 3/07
(Continued)

*Primary Examiner* — Kaitlin S Joerger
(74) *Attorney, Agent, or Firm* — Galbreath Law Offices, P.C.; John A. Galbreath

(57) ABSTRACT

The present invention is a combination of tilt tray and/or dumpster assembly that is usable on a light utility vehicle. When operating as a tilt tray, the operation of loading or unloading the tray is made easier by providing a gentle slope for moving payload onto and/or off of the tray. In dumpster mode, any load may be dumped directly off the tray. When in tilt tray mode of operation, the invention uses gravity to enable the tray assembly to pivot about pivot points as the tray assembly is moved rearwardly or forwardly on the vehicle. As the centre of gravity transits one of the pivot points, the tray assembly assumes a new tilt angle, relative to the vehicle. The tray assembly can be moved rearwardly so that its rearmost end makes contact with the ground. The tray may be loaded or unloaded when the tray assembly is in any angular position when the rearmost end is in contact with the ground. A unique hinge assembly enables the tray assembly to pivot, and/or to be forcibly rotated, depending on the mode of operation, into a wide variety of angles, relative to the ground. The invention is simple to control, compact, lightweight and versatile, making it suitable for (Continued)

use on light utility vehicles without the need for any special license or training of the operator.

16 Claims, 7 Drawing Sheets

(51) Int. Cl.
  *B62D 33/02* (2006.01)
  *B60P 3/12* (2006.01)
  *B60P 1/28* (2006.01)

(56) References Cited

U.S. PATENT DOCUMENTS

| | | | |
|---|---|---|---|
| 6,413,033 B1 * | 7/2002 | Monroig, Jr. | B60P 3/122 414/462 |
| 6,527,494 B2 * | 3/2003 | Hurlburt | B62D 63/061 298/17.5 |
| 7,033,128 B2 * | 4/2006 | Poindexter | B60P 1/4414 414/522 |
| 9,108,557 B2 * | 8/2015 | Jaeger | B60P 1/04 |
| 9,162,601 B2 * | 10/2015 | Penner | B60P 1/16 |
| 2002/0114688 A1 * | 8/2002 | Poindexter | B60P 1/16 414/477 |
| 2004/0179927 A1 * | 9/2004 | Georges | B60P 3/122 414/491 |
| 2005/0111945 A1 | 5/2005 | Miller | |
| 2009/0123260 A1 * | 5/2009 | Howard-Leicester | B60P 3/122 414/475 |
| 2010/0021276 A1 * | 1/2010 | Baughman | B60P 3/122 414/484 |
| 2011/0123304 A1 * | 5/2011 | Thomas | B60P 3/122 414/538 |
| 2013/0243563 A1 * | 9/2013 | Piercey | B60P 1/30 414/813 |
| 2015/0343937 A1 * | 12/2015 | Nespor | B60P 3/122 414/469 |
| 2017/0036588 A1 * | 2/2017 | Nicol S Gil | B60P 3/122 |

FOREIGN PATENT DOCUMENTS

| | | | | |
|---|---|---|---|---|
| FR | 2990660 A1 * | 11/2013 | | B60P 1/28 |
| GB | 2262082 | 6/1993 | | |
| WO | WO 2010004615 A1 * | 1/2010 | | B60P 3/07 |

* cited by examiner

REPOSITIONABLE LOAD CARRYING TRAY ASSEMBLY FOR A VEHICLE

FIELD OF THE INVENTION

This invention relates to utility vehicles, and particularly to light utility vehicles that can either be factory fitted or retro-fitted with a pivot and/or tilt tray assembly.

BACKGROUND OF THE INVENTION

There are a considerable number of flat tray light utility vehicles sold each year, particularly to farmers, couriers and trades people. There is an inherent problem associated with these types of vehicles that is associated with the loading and unloading of cargo. When a load exceeds the maximum safe lifting weight that a person is allowed to manipulate under prevailing health and safety requirements, the person is then obliged to use lifting apparatus to load or unload the vehicle. When a load in the range of about 100 kg to 1,000 kg is transported, that load can be too large for a conventional tail lift. In such cases, an alternative means of loading and unloading the tray is carried on the vehicle. Commonly used apparatus include a crane lift. This apparatus adds to the weight and running costs, particular in relation to fuel costs, of the vehicle. In some cases, this additional loading and unloading equipment also reduces the payload area available on the tray.

There have been many efforts made to overcome these problems. The simplest solution is to carry a set of ramps on the vehicle, so that they can be deployed if/when they are needed. This has the associated problem that they need to be carried, and ramps are only suitable for loads that can be easily rolled or slid. Ramps add to the load of the vehicle, and most likely reduce the available space available on the vehicle for its payload. In addition, there are a number of occupational health and safety issues relating to the use of ramps, particularly in relation to their tendency to suddenly collapse and potentially cause serious injuries to people, and damage to the payload being transported.

Another option includes the use of a tail or side lift to allow a user/operator to firstly lower the lift to ground level, then manipulate the load onto the lift, then raise the load using the lift to the height of the tray, and then manipulate the load off of the lift and onto the tray. There are several problems associated with this type of solution. Firstly the lift needs to be sufficiently capable of lifting the type of load that the user wishes to carry on their vehicle. Also once you have manipulated the cargo off the lift and secured down for transportation. At the delivery end you must repeat the process to get the cargo off. This type of means to load and unload your cargo still relies on manual manipulation which is another health and safety issue. The higher the load, typically the greater the bulk of the associated lift required to be able to raise it. Another limitation associated with tail lifts, or side lifts is their limited load carrying area. Many of these types of lifts used with small to medium sized utility vehicles are only 1 meter wide at most. So loads that exceed this dimension are often not able to be raised or lowered by the lift. Furthermore in the case where there is a small vehicle to be carried, such as a ride on mower etc, then it is not possible to simply allow the vehicle to move onto the tray under its own power. In addition, just like with the ramps, it is typical for the lift to add considerable bulk to the vehicle, and to impact on the space available to carry the payload.

In yet another solution, there have been attempts to include a crane within the tray of the vehicle. The user/operator can then use the crane to lift the payload off the ground in the vicinity of the vehicle, and then allow it to be manipulated onto the tray. Again there are problems associated with this type of solution. Firstly, like with the previously discussed solutions, the addition of a crane to the vehicle adds bulk, and also takes up valuable space on the tray that is then not available for the payload. You also have the problem of having the load suspended mid-air as it is lifted off the ground and moved into position on the tray. You must also have enough space around the arc of movement of the crane arm, to allow the load to be safely maneuvered to the ground. This has serious health and safety issues associated with it, particularly related to movement on the load as it is moved, and secondly related to the condition of any sling or other coupling mechanism used to temporarily connect the load to the crane.

Furthermore, because of the inherent problems associated with these types of devices, when moving cargo that weighs 100 kg to 2000 kg, people/companies quite often take the option of using a much larger truck to move their cargo which have either a large crane or a forklift carried on the vehicle. This adds additional operational costs for carrying the cargo.

It is an object of the present invention to provide an easier loading and unloading mechanism for a utility vehicle that at least mitigates some of the aforementioned problems.

SUMMARY OF THE INVENTION

Accordingly, the present invention is a repositionable load carrying tray assembly for use with a vehicle including:
 a tray, and
 winching means, and
 first pair of slidable rails, and
 second pair of slidable rails, and
 a pair of pivot arms, and
 a hinge, and
 a pair of support brackets,
 wherein the tray assembly lays substantially horizontal with respect to the vehicle when in its normal rest position. Typically in this position, the tray of the tray assembly is as far forward as it can travel, with respect to the vehicle. The first pair of slidable rails are fixed to the underside of the tray, with one slidable rail of the first pair of slidable rails located at, or near, each longitudinal side of the tray. Each rail in the second pair of slidable rails is located immediately below its corresponding rail in the first pair of slidable rails. Each rail in the first pair of slidable rails is supported by, and is slidably engaged with, its corresponding rail in the second pair of slidable rails. Each pivot arm in the pair of pivot arms is located immediately below its corresponding rail in the second pair of slidable rails so that each rail in the second pair of slidable rails is supported by, and is slidably engaged with, its corresponding pivot arm in the pair of pivot arms. Each pivot arm in the pair of pivot arms is hingedly attached by the hinge to its corresponding support bracket in the pair of support brackets, which are in turn fixed to a suitable portion of the vehicle's chassis. The winching means is connected to the tray assembly, and is capable of causing the tray to move either in a rearward direction, or in a forward direction, relative to the vehicle. Each support bracket includes a horizontal forward portion, and an inclined rearward portion. The hinge creates a pivot point at or near the juncture between the forward and rear portions of each support bracket, and the tray assembly is pivotable about the first pivot point, so that any forward or rearward motion of the tray assembly causes the centre of gravity for the tray assembly in combination with any load it may be carrying at any given time, to move either towards, or away from, the pivot point. As the centre of gravity transits the pivot point in a rearward direction, with respect to the vehicle, it causes the tray assembly to pivot about the pivot point solely under the influence of gravity so that the tray becomes inclined with respect to the vehicle. As the winching means continues to operate on the tray assembly, the tray continues to slide rearwardly of the vehicle down the incline until it eventually makes contact with the ground in the vicinity of the rear of the vehicle. When the tray is in contact with the ground, the vehicle is in a condition to be loaded and/or unloaded.

The tray assembly is returned to its normal rest position by operating the winching means in reverse, thereby causing the tray assembly to move back up the incline until the centre of gravity of the tray assembly in combination with any load it may be carrying at any given time to approach the pivot point, so that as the centre of gravity transits the pivot point, the tray assembly pivots about the pivot point, solely under the influence of gravity, and when the pivoting is completed, the tray is once again in a horizontal orientation with respect to the vehicle.

Preferably the first and second pair of slidable rails are configured to act telescopically with respect to one another so that the second pair of rails begin to slide with respect to the pivot arms only when the first pair of rails reach the maximum extent of their slidable range with respect to the second pair of rails.

Preferably any continued operation of the winching means after the tray has made contact with the ground as the tray moves in a rearward direction, relative to the vehicle, causes the rearmost end of the tray to slide along the ground away from the rear of the vehicle, thereby causing the angle of pivot to continuously decrease as the tray assembly continues to move in a rearward direction. Once the tray assembly reaches the maximum extent of its rearward distance, relative to the vehicle, the tray is at its smallest angle of inclination with respect to the vehicle.

The angle of inclination of the tray is about 25° with respect to the vehicle when the rear of the tray first makes contact with the ground, and this angle reduces to about 16° when the tray has reached its maximum rearward extent.

Optionally the rear end of the tray includes at least one roller that enables the end of the tray to roll across the ground.

The tray can be loaded or unloaded with a payload when the tray is in any angular position relative to the vehicle when the rearmost end of the tray is in contact with the ground.

Preferably there is at least one shock absorber that is connected between the tray assembly and the vehicle chassis, to absorb any shock loads that may be created when the tray assembly is moving and/or pivoting.

Optionally at least one dampener is included in the assembly to mitigate any simple harmonic motion that may be generated while the tray, and any load it may be carrying, is moving and/or pivoting, and the at least one dampener may be separate to the at least one shock absorber, or incorporated into it.

In another preferred embodiment of the current invention, the hinge provides a first and second pivot point, and the second pivot point is located to the rear of the first pivot point, relative to the front of the vehicle.

The tray assembly first pivots to a first incline angle, solely under the influence of gravity, as the centre of gravity of the tray assembly in combination with any load it may be carrying transits the first pivot point, then as the tray assembly continues to move rearwardly, and the centre of gravity transits the second pivot point, the tray assembly pivots to a second incline angle, solely under the influence of gravity.

Optionally a pneumatic, or hydraulic cylinder, is attached between the tray assembly and the vehicle chassis, and the pneumatic or hydraulic cylinder is capable of applying a user controllable force to the underside of the tray assembly via operator controllable means, and thereby allowing the operator to force the tray to rotate to a greater angle of inclination than it would otherwise pivot to about the second pivot point solely under the influence of gravity, thereby better enabling the tray to optionally dump whatever payload it may be carrying without extending the tray so far that its rear end makes contact with the ground. This feature provides the vehicle with a second "dumping" mode of operation in addition to the "tilt tray" mode.

Preferably the operation of the pneumatic or hydraulic cylinder to increase the angle of inclination of the tray assembly, with respect to the vehicle, is possible only after the tray assembly has been moved a sufficient distance rearward of the vehicle so that the centre of gravity of the tray assembly, and any load it may be carrying at any given time, has transited at least the first pivot point.

Preferably the maximum angle of inclination of the tray, when under the influence of the pneumatic or hydraulic cylinder, is about 50°.

The entire assembly is light weight and is retrofittable to a light utility vehicle up to 4 tonnes load capacity.

The winching means may be electrical and/or manually operated.

Optionally, when the winching means are electric, at least one sensor means is provided that senses when the centre of gravity of the tray assembly, and any payload it may be carrying, is nearing the first and/or second pivot points, either when the tray assembly is moving in a rearward or forward direction, and as either or both pivot points are approached, it automatically slows the speed of the winching operation to thereby minimise any jolting of the tray assembly and/or any payload it may be carrying, as the as the centre of gravity transits across either pivot points.

The hinge that is used in the present invention includes a flat plate having a first and second arcuate slot. The first arcuate slot is located towards the front of the plate, and the second arcuate slot is located towards the rear of the plate. The hinge interconnects a pivot arm in the repositionable load carrying tray assembly to a corresponding support bracket that is fixed to the chassis of the vehicle. The support bracket includes a first and second pin that extends laterally from the longitudinal direction of the support bracket, and the first pin slides within the first arcuate slot, and the second pin slides within the second arcuate slot. As the angle of inclination of the tray assembly changes during operation, the hinge is able to assume a corresponding orientations, relative to the support bracket, while keeping the pivot arms anchored in place with respect to the vehicle.

The interaction of the first slot with the first pin creates the first pivot point, and the interaction of the second slot with the second pin creates the second pivot point.

Preferably the support bracket includes a gap that plate is able to slide substantially vertically within, and the first and second pins each laterally traverse the gap. The first pin slides within the first arcuate slot, and the second pin slides within the second arcuate slot, so that any change in the inclination of the load carrying assembly as it is being repositioned, creates a corresponding change in the angular orientation of the hinge, relative to the support bracket.

Preferably the first arcuate slot is open at the base of the plate so that the first pin can exit completely from the first slot in the hinge, thereby allowing the angle of inclination of the tray assembly to exceed the angle of inclination it would make solely under the influence of gravity.

Preferably as the tray assembly moves rearwardly from its normal rest position, and the centre of gravity of the combined tray assembly and any load it may be carrying, completes its transit of the first pivot point, then the tray assembly will have then pivoted to a first angle of inclination, solely under the influence of gravity. As the tray assembly continues to move rearwardly so that the centre of gravity of the tray assembly, in combination with any load it may be carrying, begins to transit the second pivot point, the tray assembly pivots about the second pivot point solely under the influence of gravity, so that after the centre of gravity has transited the second pivot point, the tray assembly has transited to second more steep angle of inclination.

Preferably the first angle of inclination is about 8°, relative to the vehicle, and the second angle of inclination is about 25°, relative to the vehicle.

Preferably the combination of the effect of the two pivot points and the at least one shock absorber combine to mitigate any jolting force on the tray or any payload it may be carrying as the tray assembly pivots about either the first or second pivot point.

In an alternative embodiment of the present invention, the present invention is a repositionable load carrying tray assembly for use with a vehicle including:

a tray, and
hand operated winching means, and
first pair of slidable rails, and
second pair of slidable rails, and
a pair of pivot arms, and
a pair of support brackets.

The tray assembly lays substantially horizontal with respect to the vehicle, when it is in its forward most position relative to the vehicle. This is the normal rest position for the tray assembly.

The first pair of slidable rails are fixed to the underside of the tray, and support the tray on the assembly, with one slidable rail of the first pair of slidable rails located at, or near, each side of the tray.

Each rail in the second pair of slidable rails is located immediately below a corresponding rail in the first pair of slidable rails. Each rail in the first pair of slidable rails is supported by, and is slidably engaged with its corresponding rail in the second pair of slidable rails.

Each pivot arm in the pair of pivot arms is located immediately below a corresponding rail in the second pair of slidable rails so that rail in the second pair of slidable rails is supported by, and is slidably engaged with its corresponding pivot arm in the pair of pivot arms.

Each pivot arm in the pair of pivot arms is hingedly attached to a corresponding support bracket in the pair of support brackets.

The hand operated winch means is connected to the tray, and is capable of causing the tray to move in a rearward direction, or in a forward direction with respect to the vehicle.

As the tray moves, each rail of the first pair of slidable rails slides along its corresponding rail in the second pair of slidable rails, and as the movement continues, the centre of gravity of the tray, and any load it may be carrying, approaches the pivot point of the pivot arms. When the centre of gravity passes the pivot point of the pivot arms for a sufficient distance, the weight of the tray, and any load it may be carrying, causes the tray, the first and second pair of slidable rails, and the pair of pivot arms to pivot about the pivot point of the pair of support brackets.

As the pivot motion occurs, the rearward portion of the tray, and any load it may be carrying, swings downwardly towards the ground, and the forward portion of the tray, and any load it may be carrying, swings a corresponding distance upwardly.

As the tray continues to move in a rearward direction under the influence of the hand operated winching means, eventually the first pair of slidable rails reaches the maximum extent of their slidable distance with respect to the second pair of slidable rails, and then further operation of the winch creates a telescoping type of action where the second set of slidable rails to start sliding in a rearward direction with respect to the pivot arms, and this slidable rearward motion of the second pair of slidable rails carries the first pair of slidable rails and the attached tray along with them.

Also as the tray and the first and second pair of rails move rearwardly, the amount of pivot continues to increase as the centre of gravity for the tray assembly, and any load it may be carrying, moves further away from the pivot point of the hinged connector means.

Eventually the rearmost end of the tray makes contact with the ground in the vicinity of the rear of the vehicle. From then on, any further operation of the winch causing the assembly to move in a rearward direction causes the rearmost end of the tray to slide along the ground away from the rear of the vehicle.

As this occurs, the angle that the tray and rail assembly makes, relative to the vehicle, decreases as the tray moves further in a rearward direction, until it reaches its maximum rearward position relative to the vehicle.

The tray can then be loaded or unloaded when the tray is in any position where its rear end is in contact with the ground. The user can adjust the angle that the tray makes, relative to the vehicle and the ground by allowing the tray assembly to move out to its maximum rearward position relative to the vehicle.

Finally, the tray assembly can be returned to its normal rest position by operating the hand operated winching means in reverse. This causes the tray and the first pair of slidable rails to move in a forward direction relative to the vehicle.

When the centre of gravity of the tray, and any load it may be carrying, moves a sufficient distance past the pivot point, the tray, first and second slidable rails, and the pivot arms rotate about the hinge, thereby causing the rear of the tray to rotate upwardly, and the front of the tray to rotate downwardly a corresponding amount so that eventually the tray attains a horizontal orientation with respect to the vehicle.

Continued operation of the winch causes the tray and rail assemblies to move to their normal rest position.

In an alternative embodiment, the hand operated winching means is replaced with an electric motor, and suitable control means are provided to enable the operator to run the motor forwards or in reverse.

Preferably there is at least one shock absorber that is connected between the tray assembly and the vehicle chassis, to absorb any shock loads that may be created when the tray, rail and pivot arm assembly pivots.

Preferably there is either a separate dampener, or there is a dampener incorporated into the shock absorber to mitigate any simple harmonic motion that may be created while the tray, and any load it may be carrying, is pivoting.

Preferably the dampener and shock absorber are incorporated into the same housing, and it is capable of operating on the tray, slidable arms and pivot arms assembly when it is pivoting in either direction.

Some of the advantages of the present invention include the ability for people to move objects onto and off of the utility vehicle under the objects own means, like a ride on mower for example. Furthermore the present invention allows the payload to be loaded and unloaded from the vehicle within a very small foot print, and it enables an operator to use a vehicle that is more appropriately sized for the particular payload being transported. This provides economic advantages associated with transport. It also means that it is much less likely that the driver of the utility vehicle will require a special driver's licence to operate the vehicle, or the means of loading and unloading the vehicle,

BRIEF DESCRIPTION OF THE DRAWINGS

In order that the invention may be more fully understood there will now be described, by way of example only, preferred embodiments and other elements of the invention with reference to the accompanying drawings where.

DESCRIPTION OF EXAMPLES OF THE INVENTION AND THE PREFERRED EMBODIMENT

Figure 1:
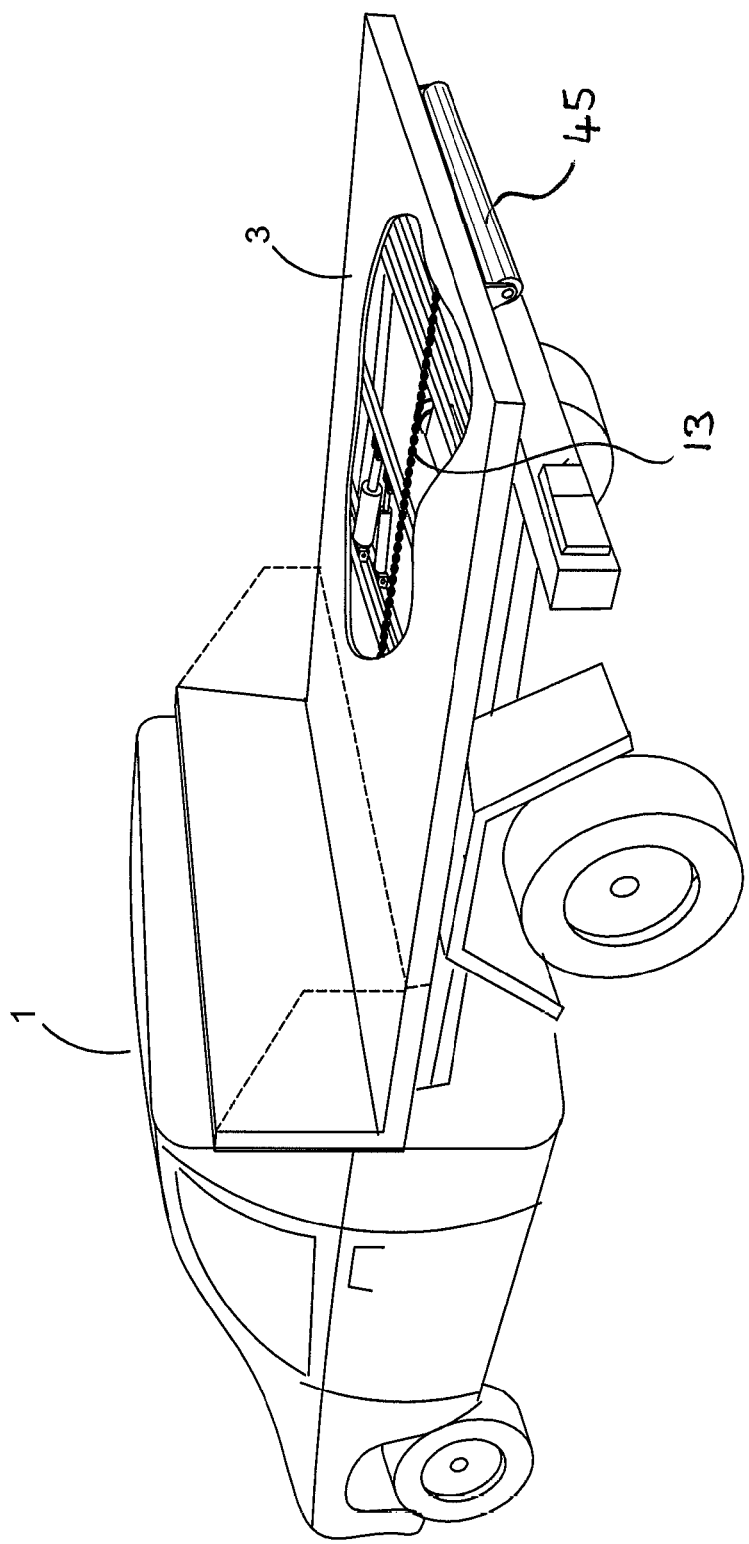
FIG. 1 is an isometric view of a vehicle with the present invention installed.

Referring to FIG. 1, we can see a vehicle 1, which is a typical light commercial utility vehicle. The vehicle has been fitted with the tray assembly 3 of the present invention. The Figure shows a cut-away section that reveals some of the detail of this preferred embodiment that would otherwise be obscured by the tray assembly 3. Looking inside the cut-away section we can see the chain 13 which is connected to a winch (see FIG. 2). The winch is capable of driving the chain 13 either forward or rearward, with respect to the front of the vehicle 1, and the movement of the chain 13 creates a corresponding movement in the tray assembly 3 either forwardly or rearwardly, with respect to the vehicle 1. The roller 45 can also be seen at the rear of the tray assembly 3.

Figure 2:
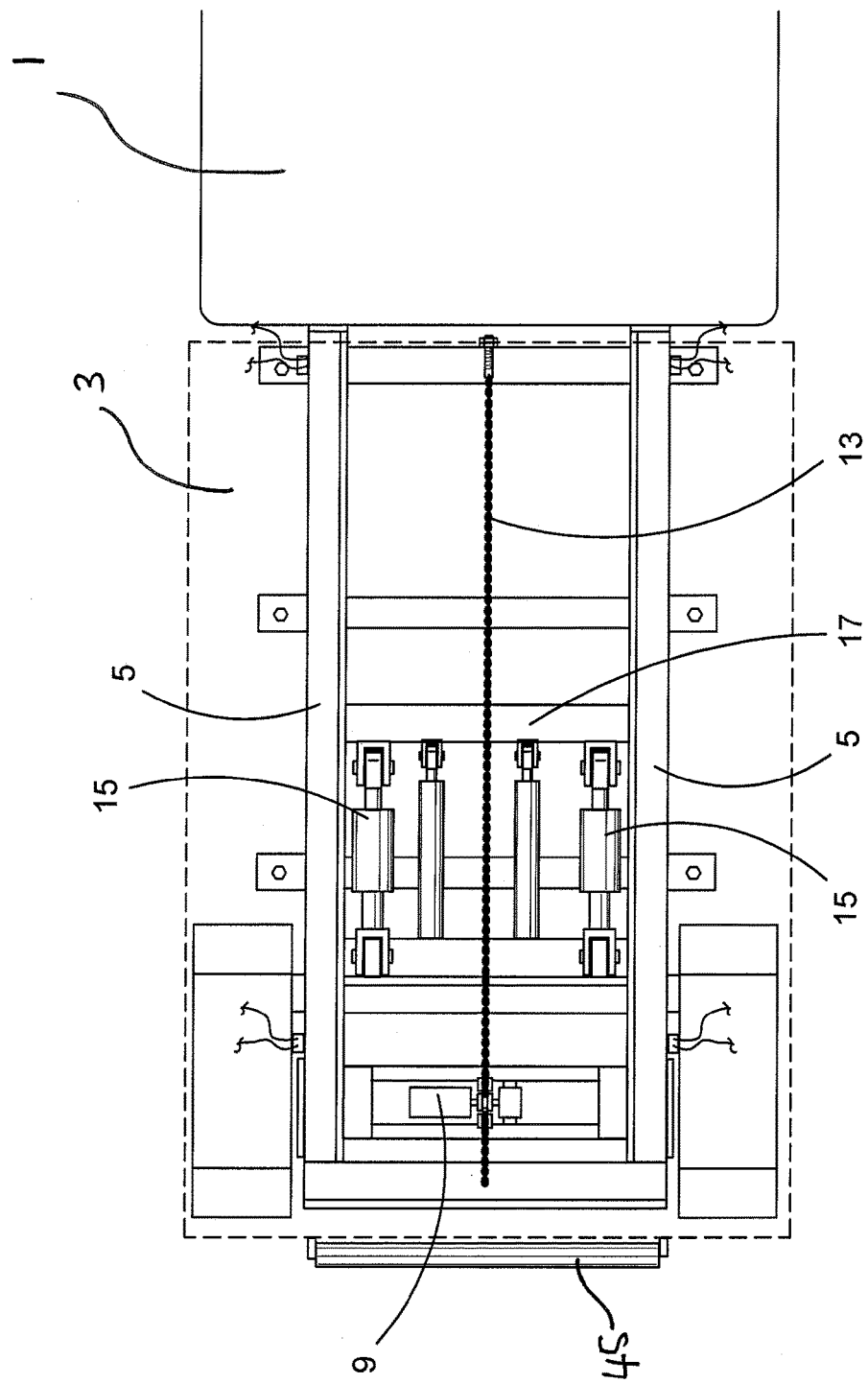
FIG. 2 is a plan view of the present invention with the repositionable tray shown only in dotted outline.

In FIG. 2, the tray assembly 3 is shown only in dotted outline so that we can see greater detail of the tray assembly 3. We can see the first pair of slidable rails 5 which are each fixed to a respective side of the underside of the tray assembly 3. We can see that there is a user controllable electric winch 9 that is capable of driving the chain 13. It should be noted that either a chain or a cable are suitable.

In this particular preferred embodiment of the present invention, there are a pair of combined shock absorbers and dampeners 15. Each combined shock absorber and dampener is capable of operation when the tray assembly pivots about a pivot point as the centre of gravity of the tray assembly 3, in combination with any load it may be carrying, transits any pivot point as the tray assembly 3 moves either forwardly or rearwardly, with respect to the vehicle 1. In another preferred embodiment the shock absorber and the dampener are separate devices that produce the same result.

The ends of the shock absorbers and dampeners are hingedly fixed to the vehicle chassis at their end nearest to the rear of the truck. The other ends are hingedly fixed to a crossbeam 17 which forms part of the structure that supports the tray assembly 3.

Optionally there is at least one hydraulic or pneumatic piston 19 (FIG. 7) which is also connected between the vehicle chassis and the crossbeam 17.

Figure 3:
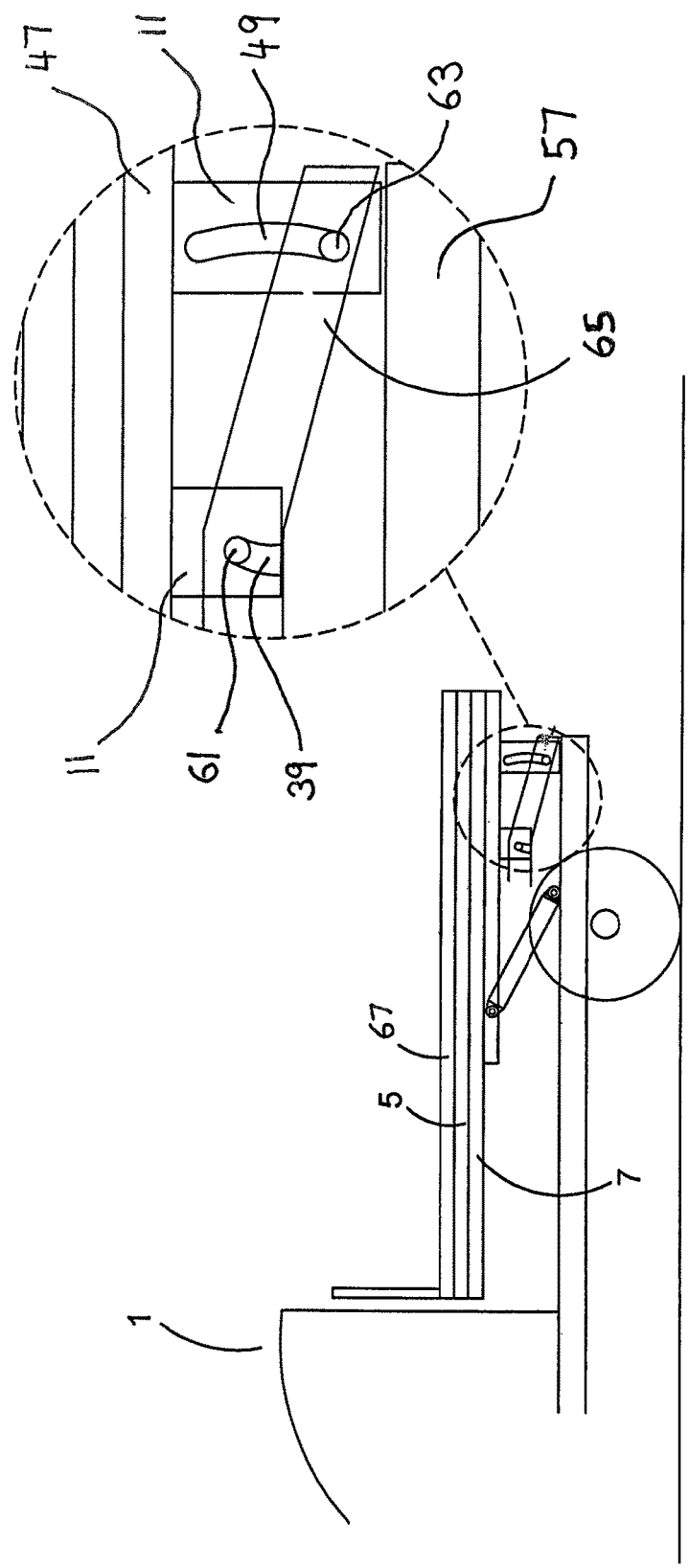
FIG. 3 is a side schematic view of a truck with the present invention installed.

Turning to FIG. 3, where we can see a side schematic view of a vehicle 1 fitted with the present invention. In this view we can see the tray 67 and the first pair of slidable rails 5 and the second pair of slidable rails 7, and we also can see an exploded view showing more details of the pivot arms 47, the hinge 11 and the support bracket 65. The support bracket 65 is fixed to the vehicle chassis 57. In the exploded view, we can see that the pivot arm 47 is connected to the hinge 11. In this preferred embodiment, the hinge 11 is shown comprising a pair of plates, however a single plate could just as easily be used. The hinge 11 includes a front arcuate slot 39 that is nearest to the front of the vehicle, and a rear arcuate slot 49. The support bracket 65 includes a front pin 61 and a rear pin 63. The front pin 61 is configured to slide within the front arcuate slot 39, and the rear pin 63 is configured to slide within the rear arcuate slot 49. As shown, the front arcuate slot 39 is open at its base.

The current view shows the tray assembly in its normal rest position, with the tray 67 sitting horizontal and fully forward, with respect to the vehicle 1. When in this configuration, the front pin 61 is located at the top of the top of the front arcuate slot 39, and the rear pin 63 is located near the bottom of the rear arcuate slot 49. The front pin 61 combines with the front arcuate slot 39 to create the first pivot point about which the tray assembly initially tilts to as the centre of gravity of the tray assembly in combination with any load it may be carrying fully transits the first pivot point.

Figure 4:
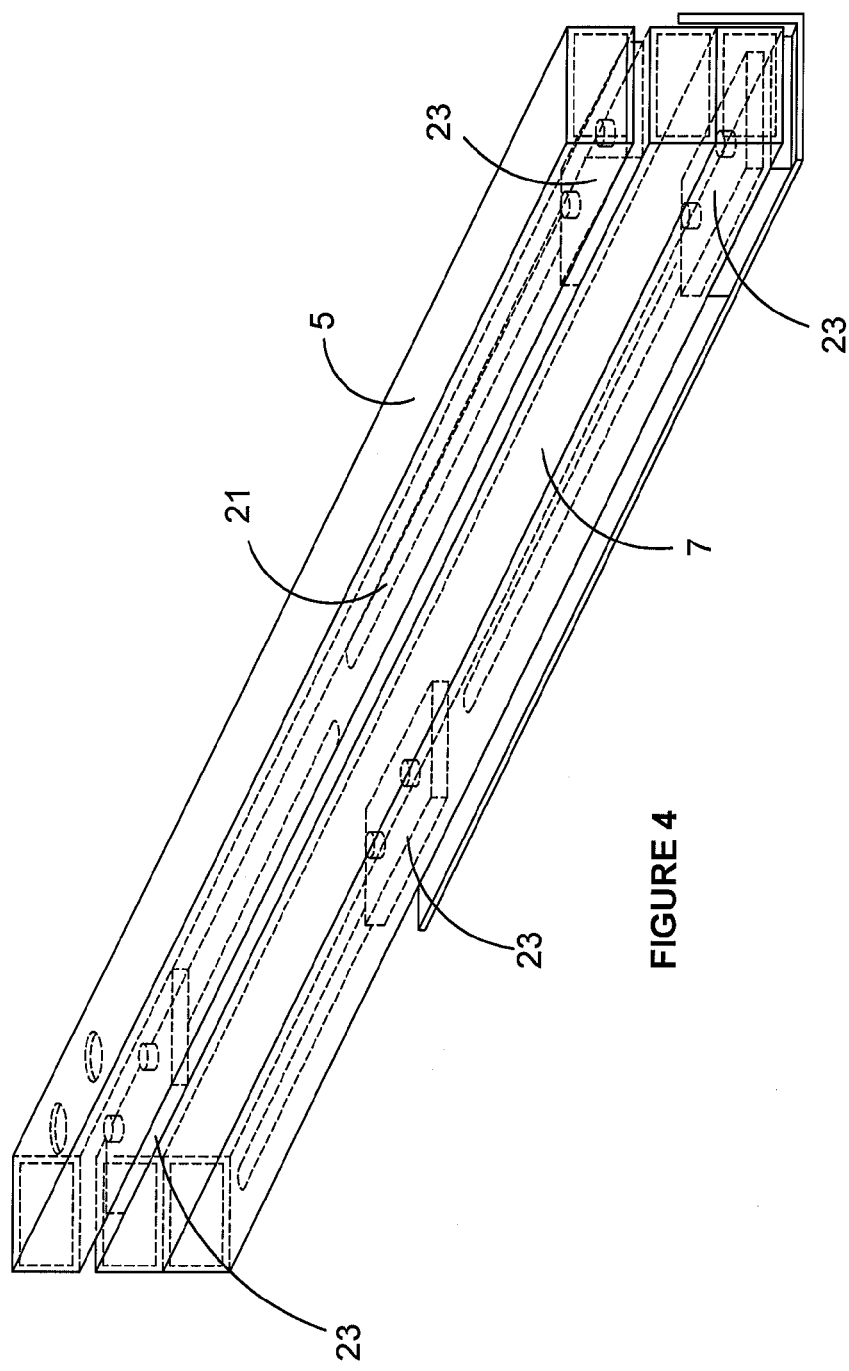
FIG. 4 is an isometric view of the first and second slidable rails.

Turning to FIG. 4 we are shown how one rail of the first pair of slidable rails 5 is configured to ride within an elongate slot 21 of its respective rail in the second pair of slidable rails 7 via retaining plates 23. The retaining plates 23 slidably fasten each rail in the first pair of slidable rails 5 to its respective rails in the second pair of slidable rails 7. Any continued motion of the first pair of slidable rails 5 after they have reached the maximum extent of its travel so that it abuts against either end of the elongate slot 21, it creates a telescopic action that forces each rail in the second pair of slidable rails 7 to start to slide.

Figure 5:
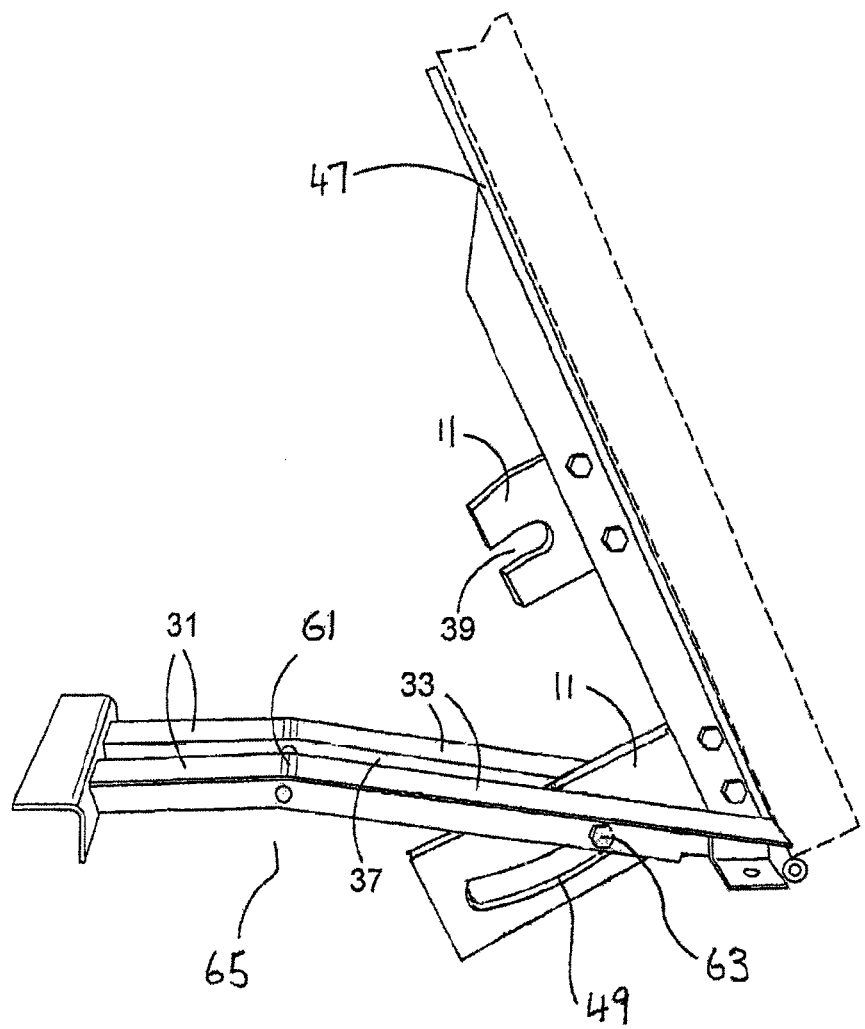
FIG. 5 is a side view of the hinged connector.

In FIG. 5, we are shown an isometric view of the support bracket of the support bracket 65, the hinge 11, and the pivot arm 47. The support bracket 65 includes a forward portion 31 and an inclined rear portion 33. The front pin 61 is located at or near the juncture between the forward portion 31 and the inclined rear portion 33 of support bracket 65. The support bracket 65 is shown in this embodiment as having an elongate gap 37 that enables the hinge 11 to slide within as its angular orientation changes as the tray assembly pivots. The front pin 61 combines with the front arcuate slot 39 to create the first pivot point. Because of the unique design of the hinge 11, the pivot arm 47 can have multiple angular orientations while remaining fixed to the support bracket 65 via the hinge 11. As the tray assembly pivots around the first pivot point, the rear arcuate slot 49 slides downwardly until the top of the slot abuts against the rear pin 63. The second arcuate slot 49 and the rear pin 63 combine to create a second pivot point for the tray assembly.

As the tray assembly pivots into the second inclined angle, the front arcuate slot 39 slides upwardly, away from the front pin 61. When the angle of inclination exceeds a certain point, the front arcuate slot 39 completely disengages from the front pin 61. The freedom given to the pivot arm 47 to move into a wide variety of angles with respect to the vehicle means that the attached tray assembly has the freedom to move into a wide variety of angles with respect to the vehicle, thereby allowing the tray to be angled for easy loading and unloading operations, and/or tipping and dumping operations.

As shown in FIGS. 6 *a* to *d*, in one use scenario, the winch is used to drive the pivot tray assembly from its normal rest position on the back of the vehicle in the direction of the arrow. As the tray 67 moves rearwardly, the first pair of slidable rails 5 slide along the bottom pair of slidable rails 7. Eventually the centre of gravity of the tray assembly in combination with any load it may be carrying approaches the first pivot point that is creates by the interaction of the front pin 61 with the front arcuate slot 39.

Figure 6A:
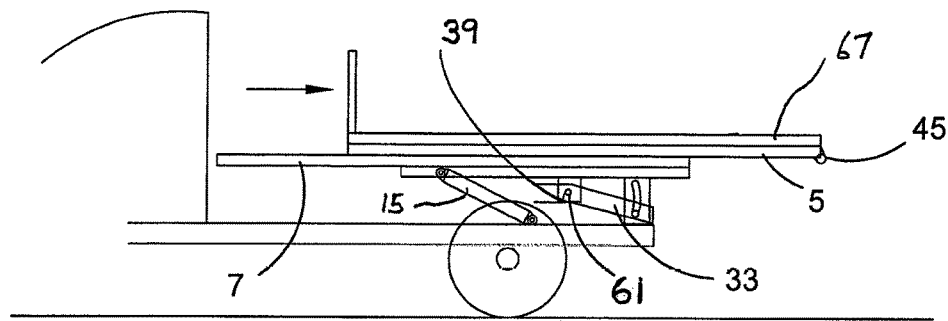
FIGS. 6 a to d show the repositionable tray in a variety of positions.
Figure 6B:
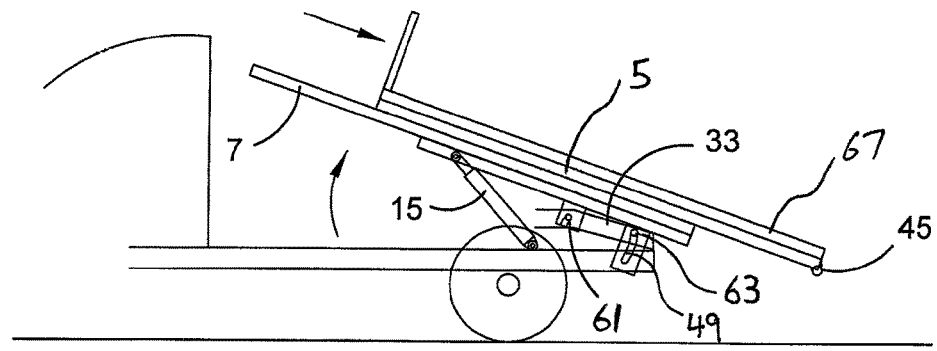

As it transits the first pivot point, the tray assembly pivots solely under the influence of gravity into a first inclined position, as shown by the curved arrow in FIG. 6*b*. In this angular orientation, the front pin 61 is at the top of the front arcuate slot 39, and the rear pin 63 is at the top of the rear arcuate slot 49.

As the operator continues to move the tray assembly rearwardly, the centre of gravity eventually transits the second pivot point that is created by the combination of the rear pin 63 with the rear arcuate slot 49, and the tray assembly pivots, solely under the influence of gravity, into a second inclined angle.

Typically the first angle of incline is about 8° to the horizontal, and the second angle of incline is about 25°.

Any shock load or simple harmonic motion created by the pivoting motion of the tray assembly is mitigated by the shock absorber 15 and the dampener respectively.

As the operator continues to move the tray assembly rearwardly, eventually the rear of the tray 67 makes contact with the ground.

Figure 6C:
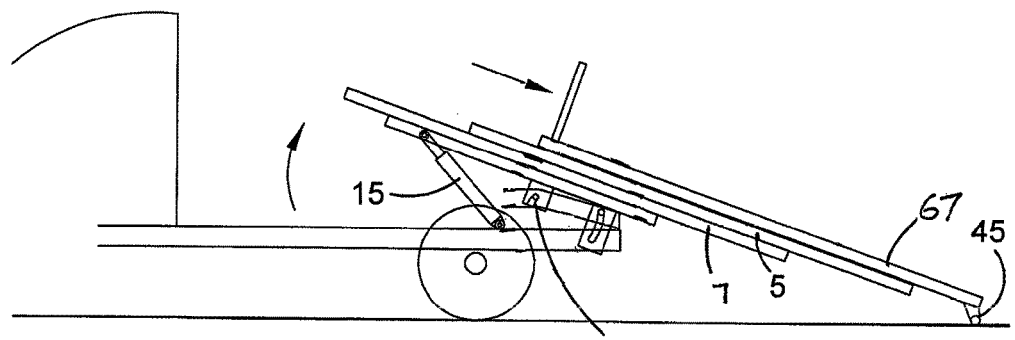

If the user/operator continues to operate the winch 9, the tray assembly 3 and the first pair of slidable rails 5 continue to slide upon the now inclined second pair of slidable rails 7 as shown in FIG. 6*c*. Eventually the first pair of slidable rails 5 reach the limit of their slidable movement with respect to the second set of slidable rails 7. Once they reach this point, and further operation of the winch causes a telescope type action whereby the first pair of slidable rails 5 force the second pair of slidable rails 7 to start sliding with respect to the pivot arms 47. Eventually the rear roller 45 of the tray makes contact with the ground at the rear of the vehicle. If the user/operator continues to operate the motor, the rear roller 45 rolls along the ground. When the roller 45 is in contact with the ground, the tray 67 is in a condition to be loaded and/or unloaded.

Figure 6D:
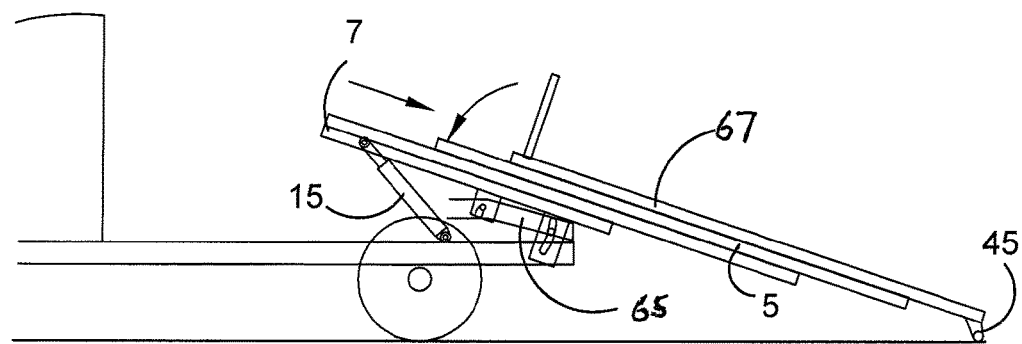

When on level ground, as shown in FIG. 6*d*, if the operator continues to operate the winch 9 to force the tray assembly further in a rearward direction, the roller 45 enables the tray 67 to roll along the ground. As it does so, the slope of the tray 67 relative to the vehicle reduces in angle, as the tray assembly begins to rotate around the second pivot point in the direction of the curved arrow shown, thereby making it a gentler slope to load and/or unload the tray 67. Typically this gentler slope is around 16°. Eventually the front arcuate slot 39 will engage the front pin 61, and the tray assembly 3 will lift off the rear pin 63. From then on, the tray assembly is supported by the combination of the front pin 61 and the roller 45.

If the ground is uneven, and the vehicle for example is inclined, then the tray assembly may not pivot about the second pivot point far enough to causer the front pin 61 to engage with the front arcuate slot 39, and therefore even at full extension, the tray assembly 3 remains supported on the combination of the rear pin 63 and the roller 45.

The tray 67 of the tray assembly 3 may be loaded or unloaded at any angle of tilt once the roller 45 has made contact with the ground. This arrangement gives the operator of the vehicle the freedom to load and unload the vehicle with the minimum of clear space in the vicinity of the rear of the vehicle, when clear space is limited, and to fully extend the tray to its maximum extension, when there is space to do so.

Figure 7:
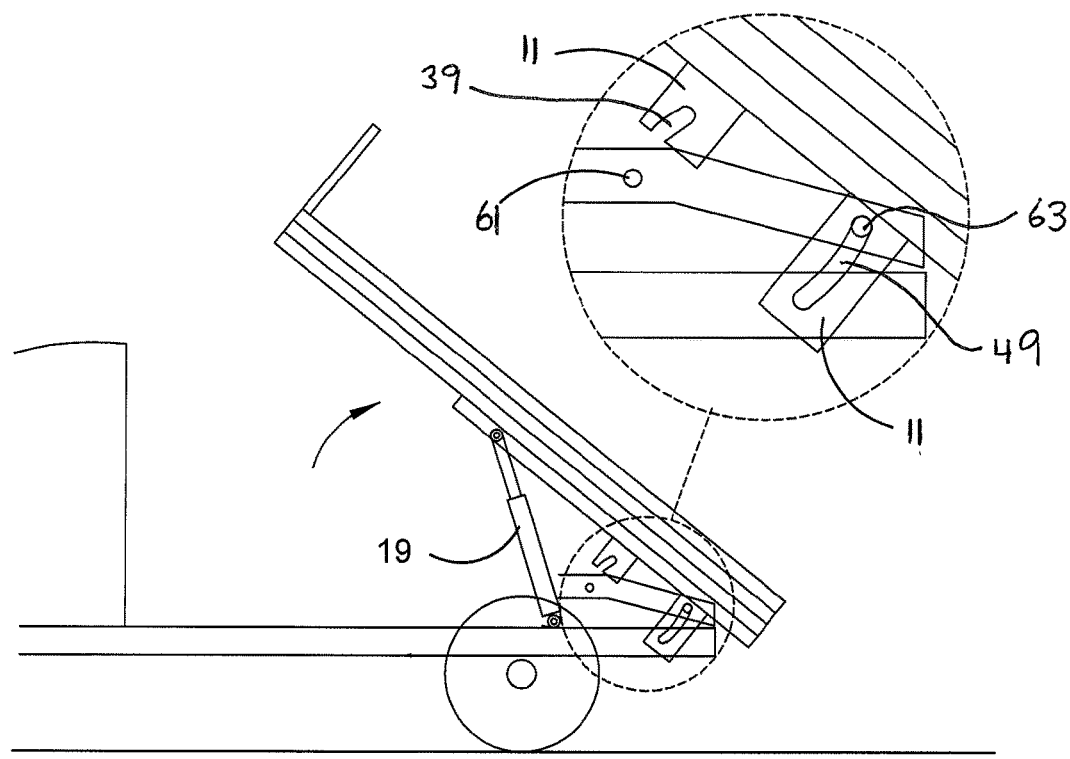
FIG. 7 is a side view of the present invention being operated in an optional "dump truck" mode of operation.

Turning to FIG. 7, we can see an optional mode of operation for the present invention. In this view, no rearward motion of the tray assembly has been created by the operation of the winch. Instead, the tray assembly has been forced upwardly in the direction shown by the curved arrow about the second pivot point. By incorporating a pneumatic or hydraulic piston 19, the user/operator has the option to force the tray assembly to swing upwardly to a much greater angle than the tray assembly would pivot to if left to do so solely under the influence of gravity. When used in this mode of operation, the tray can be inclined at a much greater angle, allowing the operator to cause the tray assembly 3 to dump its load.

In an alternative preferred embodiment, to minimize the weight and power rating of the pneumatic or hydraulic cylinder, the dumping mode of operation is not possible until the operator has moved the tray assembly a sufficient distance rearwardly, so that the centre of gravity has transited the second pivot point, and therefore the tray assembly has pivoted, solely under the force of gravity, into its second inclined position.

Typically the maximum angle that the pneumatic or hydraulic cylinder can force the tray assembly to rotate to is about 50°.

By adding a dumping mode of operation to the assembly, the invention has greater utility while maintaining a simple, compact and light design for use in light utility vehicles. Furthermore, the invention is capable of being retro-fitted to many models of light utility vehicle already in use.

In another preferred embodiment, a lift sensor is used in combination with the front and rear pivot point. The lift sensor is able to detect the change in weight as the tray assembly begins to lift off the opposite pivot point to the one that the centre of gravity of the tray assembly in combination with any load it may be carrying is transiting at any given time. The output of the lift sensor is fed back to the winching means, and the speed of the winching operation can be slowed down to reduce the shock load created when the tray assembly begins to pivot about a particular pivot point, solely under the influence of gravity. After the transition has been completed, and the tray assembly has attained a new angular position, relative to the vehicle, the winching means may speed back up until the movement operation on the tray assembly has completed. The combination of the variation in the speed of the winch, and/or the shock absorber, and/or the dampener, may combine to give the tray assembly smoother operation under a variety of load conditions as it is moved into a variety of positions, relative to the vehicle.

While the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge.

The invention claimed is:

1. A repositionable load carrying tray assembly for use with a light utility vehicle including:
   a tray, and
   winching means, and
   first pair of slidable rails, and
   second pair of slidable rails, and
   a pair of pivot arms, and
   a hinge, and
   a pair of support brackets,
   wherein the tray assembly lays substantially horizontal with respect to the vehicle, when the tray assembly is in its normal rest position, and the first pair of slidable rails are fixed to the underside of the tray, with one slidable rail of the first pair of slidable rails located at, or near, each longitudinal side of the tray, and wherein each rail in the second pair of slidable rails is located immediately below its corresponding rail in the first pair of slidable rails, and wherein each rail in the first pair of slidable rails is supported by, and is in face to face slidable engagement with, its corresponding rail in the second pair of slidable rails, at all times, and wherein each pivot arm in the pair of pivot arms is located immediately below its corresponding rail in the second pair of slidable rails, so that each rail in the second pair of slidable rails is supported by, and is in face to face slidable engagement with, its corresponding pivot arm in the pair of pivot arms, at all times, and wherein each pivot arm in the pair of pivot arms is hingedly attached by the hinge to its corresponding support bracket in the pair of support brackets, which are in turn fixed to a suitable portion of the vehicle's chassis, and wherein the winching means is located at, or near, the rear of the vehicle, and connected to the tray assembly, and is capable of causing the tray to move either in a rearward direction, or in a forward direction, relative to the vehicle, and wherein each support bracket includes a horizontal forward portion, and an inclined rearward portion, and the hinge creates a first pivot point at, or near, the juncture between the forward and rear portions of each support bracket, and the tray assembly is pivotable about the first pivot point, so that any forward or rearward motion of the tray assembly causes the centre of gravity for the tray assembly, in combination with any load it may be carrying at any given time, to move either towards, or away from, the first pivot point, and wherein as the centre of gravity transits the first pivot point in a rearward direction, with respect to the vehicle, it causes the tray assembly to pivot about the first pivot point, solely under the influence of gravity, so that the tray assembly rotates about the first pivot point and moves into a first inclined orientation, with respect to the vehicle, and as the winching means continues to operate on the tray assembly, the tray continues to slide rearwardly of the vehicle down the first incline until it eventually makes contact with the ground in the vicinity of the rear of the vehicle, and when in contact with the ground, the tray assembly is in a condition to be loaded or unloaded.

2. A repositionable load carrying tray assembly as claimed in claim 1 wherein the tray assembly is returned to its normal rest position by operating the winching means in reverse, thereby causing the tray assembly to firstly move back up the first incline until the centre of gravity of the tray assembly, in combination with any load it may be carrying at any given time, approaches the first pivot point, so that as it transits the first pivot point, the tray assembly pivots about the first pivot point, solely under the influence of gravity, and when the pivoting is completed, the tray is once again in a horizontal orientation with respect to the vehicle.

3. A repositionable load carrying tray assembly as claimed in claim 2 wherein the first and second pair of slidable rails are configured to act telescopically with respect to one another so that the second pair of rails begin to slide with respect to the pivot arms only when the first pair of rails reach the maximum extent of their slidable range with respect to the second pair of rails.

4. A repositionable load carrying tray assembly as defined in claim 1 wherein the hinge provides a first and a second pivot point, and the second pivot point is located to the rear of the first pivot point, relative to the front of the vehicle.

5. A repositionable load carrying tray assembly as defined in claim 4 wherein the tray assembly first pivots to a first incline angle, solely under the influence of gravity, as the centre of gravity of the tray assembly, in combination with any load it may be carrying, transits the first pivot point, then as the tray assembly continues to move rearwardly, and the centre of gravity transits the second pivot point, the tray assembly pivots to a second incline angle, solely under the influence of gravity, and as the winching means continues to operate on the tray assembly, the tray assembly continues to slide rearwardly of the vehicle down the second incline until it eventually makes contact with the ground in the vicinity of the rear of the vehicle.

6. A repositionable load carrying tray assembly as defined in claim 5 claim wherein a pneumatic, or hydraulic cylinder, is attached between the tray assembly and the vehicle chassis, and the pneumatic or hydraulic cylinder is capable of applying a user controllable force to the underside of the tray assembly, via operator controllable means, thereby allowing the operator to force the tray to rotate to a greater angle of inclination than it would otherwise pivot to about the second pivot point, solely under the influence of gravity, thereby better enabling the tray to optionally dump whatever payload it may be carrying, without extending the tray so far that its rear end makes contact with the ground.

7. A repositionable load carrying tray assembly as defined in claim 6 wherein the operation of the pneumatic or hydraulic cylinder to increase the angle of inclination of the tray assembly, with respect to the vehicle, is possible only after the tray assembly has been moved a sufficient distance rearward of the vehicle, so that the centre of gravity of the tray assembly, and any load it may be carrying at any given time, has transited at least the first pivot point.

8. A repositionable load carrying tray assembly as defined in claim 7 wherein the maximum angle of inclination of the tray, when under the influence of the pneumatic or hydraulic cylinder, is about 50°.

9. A repositionable load carrying tray assembly as defined in claim 4 wherein the winching means are electric, and at least one sensor means is provided that senses when the centre of gravity of the tray assembly, and any payload it may be carrying, is nearing the first or second pivot point, either when the tray assembly is moving in a rearward or forward direction, and as either pivot point is approached, it automatically slows the speed of the winching operation, to thereby slow the linear speed of the tray assembly, to minimise any jolting of the tray assembly, or any payload it may be carrying, as the as the centre of gravity transits across either pivot point.

10. A hinge for use in a repositionable load carrying tray assembly as defined in claim 4, including a flat plate having a first and second arcuate slot wherein the first arcuate slot is located towards the front of the plate, and wherein the second arcuate slot is located towards the rear of the plate, and wherein the hinge interconnects a pivot arm in the repositionable load carrying tray assembly to a corresponding support bracket that is fixed to the chassis of the vehicle, and wherein the support bracket includes a first and second pin that extends laterally from the longitudinal direction of the support bracket and the first pin slides within the first arcuate slot, and the second pin slides within the second arcuate slot so that any change in the inclination of the load carrying assembly as it is being repositioned, the hinge is able to assume a wide variety of angular positions, relative to the support bracket, while keeping the pivot arms anchored in place with respect to the vehicle.

11. A hinge as claimed in claim 10 wherein the interaction of the first slot with the first pin creates the first pivot point, and the interaction of the second slot with the second pin creates the second pivot point.

12. A hinge as defined in claim 11 wherein the support bracket includes a gap that plate is able to slide substantially vertically within, and the first and second pins each laterally traverses the gap, and the first pin slides within the first arcuate slot, and the second pin slides within the second arcuate slot so that any change in the inclination of the load carrying assembly as it is being repositioned, the hinge is able to assume a wide variety of angular positions, relative to the support bracket.

13. A hinge as defined in either claim 12 wherein the first arcuate slot is open at the base of the plate, so that the first pin can exit from the first slot in the hinge, thereby allowing the angle of inclination of the tray assembly to exceed the angle of inclination it would make solely under the influence of gravity.

14. A hinge as defined in claim 13 wherein as the tray assembly moves rearwardly from its normal rest position, and the centre of gravity of the combined tray assembly and any load it may be carrying, completes its transit of the first pivot point, the tray assembly will have then pivoted to a first angle of inclination, then as the tray assembly continues to move rearwardly, so that the centre of gravity of the tray assembly in combination with any load it may be carrying begins to transit the second pivot point, the tray assembly pivots about the second pivot point solely under the influence of gravity, so that after the centre of gravity has transited the second pivot point, the tray assembly has transited to second more steep angle of inclination.

15. A repositionable load carrying tray assembly as defined in claim 14 wherein the first angle of inclination is about 8°, relative to the vehicle, and the second angle of inclination is about 25°, relative to the vehicle.

16. A repositionable load carrying tray assembly as defined in claim 15 wherein the combination of the effect of the two pivot points and the at least one shock absorber combine to mitigate any jolting force on the tray or any payload it may be carrying as the tray assembly pivots about either the first or second pivot point.

* * * * *